United States Patent [19]

Cotzas et al.

[11] Patent Number: 4,682,068
[45] Date of Patent: Jul. 21, 1987

[54] LIQUID COOLED STATIC EXCITATION SYSTEM FOR A DYNAMOELECTRIC MACHINE

[75] Inventors: George M. Cotzas, Schenectady; Morris V. VanDusen, Clifton Park; Thomas E. VanSchaick, Burnt Hills, all of N.Y.

[73] Assignee: General Electric Company, Schenectady, N.Y.

[21] Appl. No.: 776,331

[22] Filed: Sep. 16, 1985

[51] Int. Cl.$^4$ .................. H02K 9/197; H02P 11/00
[52] U.S. Cl. .................................. 310/198; 310/64; 310/176; 310/68 D; 322/59
[58] Field of Search ............ 310/52, 54, 57, 59, 310/62, 68 D, 89, 198, 64, 72, 176; 322/59, 57, 62

[56] References Cited

U.S. PATENT DOCUMENTS

| | | | |
|---|---|---|---|
| 2,695,368 | 11/1954 | Kilbourne | 310/54 |
| 2,951,954 | 9/1960 | Willyoung | 310/57 |
| 3,114,094 | 12/1963 | Lee | 310/68 D |
| 3,145,314 | 8/1964 | Becker . | |
| 3,702,964 | 11/1972 | Kudlacik . | |
| 3,702,965 | 11/1972 | Drexler et al. . | |
| 3,758,842 | 9/1973 | Kudlacik . | |
| 3,768,002 | 10/1973 | Drexler et al. . | |
| 4,032,874 | 6/1977 | Kudlacik et al. | 336/60 |
| 4,317,952 | 3/1982 | Armor et al. | 318/238 |
| 4,477,767 | 10/1984 | Cotzas | 310/198 |
| 4,496,862 | 1/1985 | Weber | 310/54 |

*Primary Examiner*—Patrick R. Salce
*Assistant Examiner*—D. L. Rebsch
*Attorney, Agent, or Firm*—Jerome C. Squillaro

[57] ABSTRACT

An excitation system of a large dynamoelectric machine includes an excitation transformer having a liquid coolant system. The coolant system of the transformer is supplied with a liquid coolant, preferably from an existing source of de-ionized water, thereby permitting a smaller transformer to be used and/or the output rating of the transformer (and ultimately the output rating of the machine) to be increased, while using the same size transformer. The transformer may be disposed separate from, yet closely proximate, the machine.

17 Claims, 3 Drawing Figures

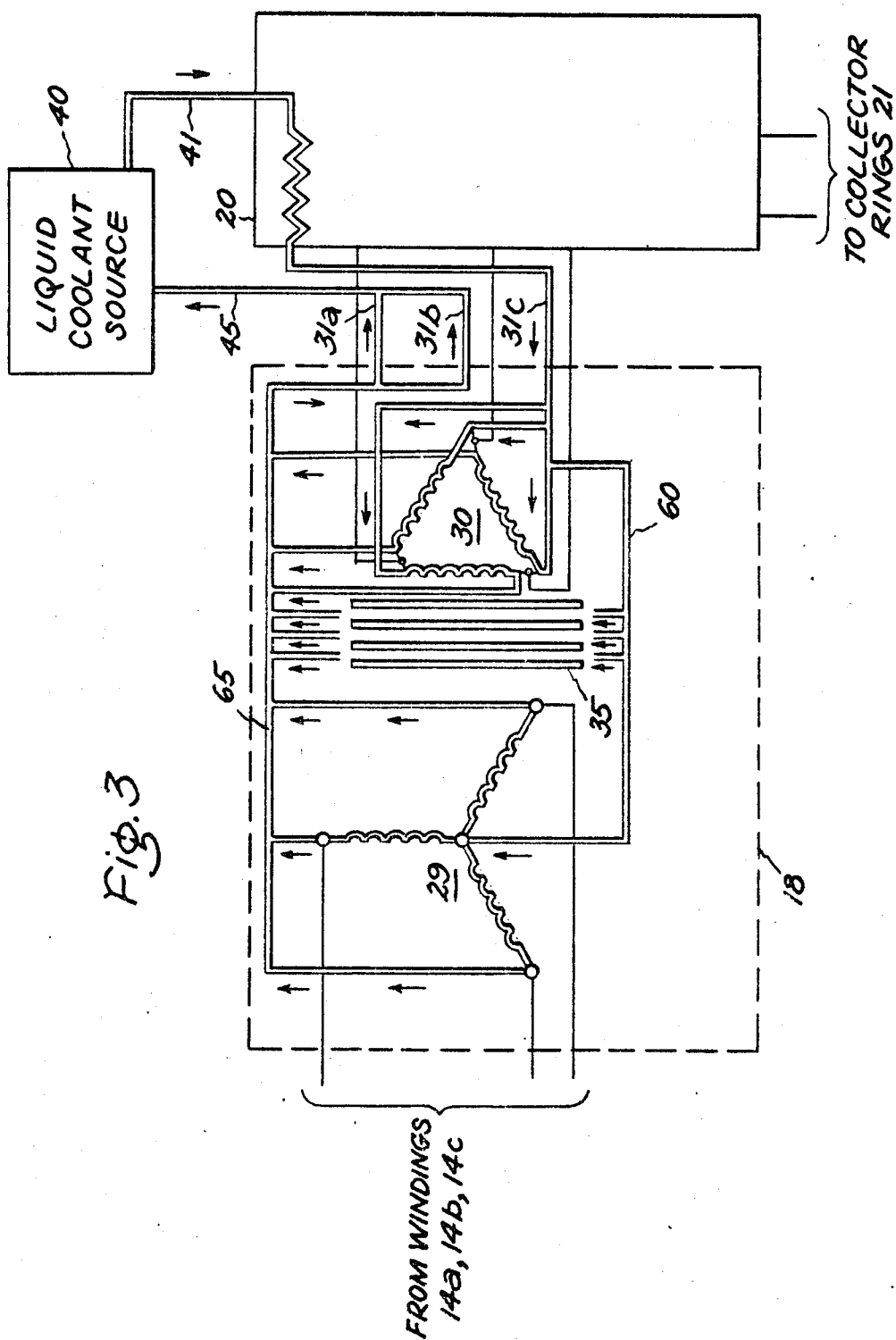

LIQUID COOLED STATIC EXCITATION SYSTEM FOR A DYNAMOELECTRIC MACHINE

BACKGROUND OF THE INVENTION

The present invention relates to static excitation systems for large fluid cooled dynamoelectric machines, or electric generators, and, more particularly, to static excitation systems using liquid cooled components, especially a liquid cooled excitation transformer.

Excitation systems for large dynamoelectric machines, such as turbine-generator combinations employed by electric utilities, have grown in power rating along with power ratings of generators themselves. (As used herein, the term "large dynamoelectric machine" refers to one which has a power rating in excess of approximately 50 megawatts.) Early excitation systems included rotating power sources, such as a separate DC generator driven by the turbine-generator shaft, that supplied excitation current to rotating field windings through slip rings and brushes. Another approach employed an AC exciter driven by the turbine-generator with rectification and control of the excitation voltage available in external stationary rectifier banks. Still another approach used diode rectifiers mounted on the rotor, wherein the entire rectification power source rotated, and control was effected through electromagnetic flux linkages with the rotating components. An example of an excitation system having rotating rectification means is found in U.S. Pat. No. 3,768,002—Drexler et al, issued Oct. 23, 1973, and assigned to the present assignee.

Excitation systems having less severe cooling demands are possible, particularly where a high response ratio is not required. A simple excitation system, for example, appears to be disclosed in U.S. Pat. No. 3,132,296 issued May 5, 1964 to Nippes. However, the excitation system in the U.S. Pat. No. 3,132,296 is solely directed toward utilizing the third and higher harmonics of the fundamental frequency of the rotor magnetic flux. Such systems as disclosed therein are not practical for large dynamoelectric machines. The third or other higher harmonic is not capable of providing sufficient power to the excitation system of a large dynamoelectric machine for producing the required high level of generator power output.

A separate category of excitation systems is referred to as "static" because the excitation power source does not rotate, but is stationary or static. A compound excitation system of the static type is shown, for example, in U.S. Pat. No. 3,702,965—Drexler et al. and U.S. Pat. No. 3,702,964 —Kudlacik et al, both issued Nov. 14, 1972, and both assigned to the present assignee. The U.S. Pat. No. 3,702,964 and 3,702,965 describe a static excitation system for a large dynamoelectric machine wherein the excitation transformer may be disposed in a sealed enclosure that is separate from, yet physically closely adjacent to, the generator casing. It is clear from the description of the cooling system for the excitation transformer and the respective references to U.S. Pat. No. 2,695,368—Kilbourne, issued Nov. 23, 1954, and assigned to the present assignee, that the coils of the excitation transformer of the '964 and '965 patents are cooled by internal liquid coolant available from the generator, whereas the core laminations and main body of the excitation transformer are cooled by the same gas, typically hydrogen, which is used to cool the generator.

An excitation transformer using a winding and core coolant system that is isolated from the generator cooling system could be readily disconnected from the generator and conveniently repaired and/or replaced while an auxiliary excitation source is connected to the generator, thus reducing expected outage, or downtime, for the generator. In addition, a transformer sharing the gas cooling supply of the generator is generally situated either in a cooling dome of the generator casing, or housing, or in a pressurized, gas tight enclosure separate from the generator casing. In either case, the cooling dome or pressurized enclosure must be fabricated to the same specifications, such as the boiler code, as is the generator housing itself, in order to withstand internal forces without causing external damage. It would be desirable to provide a liquid-cooled excitation transformer since, by cooling the entire transformer, including windings, core and electrical connections with a liquid, the transformer can be disposed outside the pressurized gas environment and much of the expense for materials, processes and time required to fabricate the containment structure of the transformer can be eliminated, resulting in an overall saving for the ultimate customer. In addition, replacing a gas coolant with a liquid coolant would generally permit a smaller transformer for the same equivalent rating to be fabricated, or, if desired, more core laminations could be added to the same size package, thereby increasing the rating of the transformer, and ultimately the available generator output power.

It may be possible to provide coolant isolation between the excitation transformer and the generator by disposing the excitation transformer relatively remote from the generator and using separate coolant sources. Such orientation is typically employed when an oil-filled transformer, having an oil such as Pyranol for internal cooling is used. It is believed that these oil-filled transformers are generally not disposed within the same room as the generator, in part due to potential detrimental environmental effects to operating personnel. However, in order to minimize the length of coolant connections required, and further to minimize the length of electrical conductors from the generator to be coupled to the primary windings of the excitation transformer and length of electrical conductors from the secondary windings of the excitation transformer to be coupled to rectifier means and ultimately to field windings of the generator, it is desirable that the excitation transformer be disposed closely proximate the generator, and, certainly, within the same room or compartment of a building as the generator.

In the static excitation system described in U.S. Pat. No. 4,477,767—Cotzas, issued Oct. 16, 1984, and assigned to the present assignee, the excitation system is described as being disposed preferably within the generator housing in a cooling dome, directly in the flow path for and cooled by the same coolant fluid that is used for cooling the main portion of the generator. Although the electrical configuration of the excitation circuit of the U.S. Pat. No. 4,477,767 permits use of a smaller excitation transformer over previous transformers, it is still desirable further to reduce the size of the excitation transformer and to isolate coolant flow within the excitation transformer from the primary generator coolant flow.

In order yet further to reduce the size of the excitation transformer, it would be desirable that the transformer be cooled with a liquid, such as water, having a higher thermal conductivity than gases presently used for cooling. When water is used directly to cool the core of a transformer, it is generally necessary that the water be deionized to reduce its electrical conductivity. It would be preferable to use an existing source of deionized water, rather than provide a separate facility for deionizing water, since initial capital cost for establishing the separate facility may be expected to weigh heavily against benefits to be obtained by use of the present invention, when considered by anticipated sophisticated users, like commercial power utilities, in any financial or cost/benefit analysis for determining feasibility of installing an excitation system and liquid cooled transformer in accordance with the present invention.

Accordingly, it is an object of the present invention to provide a smaller excitation transformer for a static excitation system of a large dynamoelectric machine than those transformers previously used.

A further object of the present invention is to provide an excitation transformer which may be disposed closely proximate the dynamoelectric machine.

Another object of the present invention is to provide a static excitation system wherein coolant flow within components of the excitation system is isolated from the coolant system of the large dynamoelectric machine.

Still another object of the present invention is to provide a static excitation system wherein a liquid coolant is used to cool the core and windings of a transformer of the excitation system.

Yet another object of the present invention is to use an existing source of deionized water for providing one type of liquid coolant to the excitation transformer.

A further object of the present invention is to increase the output rating of an excitation transformer having the same outline dimensions as a previously used excitation transformer.

Other objects of the present invention are to eliminate undesirable features of a pressure vessel enclosure that is required when using a gas cooled transformer and to improve access to the transformer for inspection and maintenance.

SUMMARY OF THE INVENTION

In accordance with the present invention, a static excitation system for a dynamoelectric machine, wherein the machine has a rotatable field winding for producing a rotating magnetic field, a stator core with a multiphase set of main armature windings disposed in slots in the stator core and cooling means for providing a first coolant for cooling at least the set of main armature windings, comprises a multiphase excitation transformer having a core and a set of primary and corresponding set of secondary windings. The primary windings are appropriately electromagnetically coupled to the main armature windings and the secondary windings are appropriately connected to rectifier means for supplying electrical energy to the field winding of the machine for producing the magnetic field. The excitation transformer includes heat exchange means in heat flow communication with the core of the transformer, wherein the heat exchange means operationally includes a liquid coolant, such as a portion of the first coolant, for cooling the core of the transformer.

The features of the invention believed to be novel are set forth with particularity in the appended claims. The invention itself, however, both as to organization and method of operation, together with further objects and advantages thereof, may best be understood by reference to the detailed description taken in connection with the accompanying drawing.

BRIEF DESCRIPTION OF THE DRAWING

FIG. 3 is a schematic diagram particularly illustrating another embodiment of a cooling system for the excitation system of FIG. 1.

DETAILED DESCRIPTION

Figure 1:
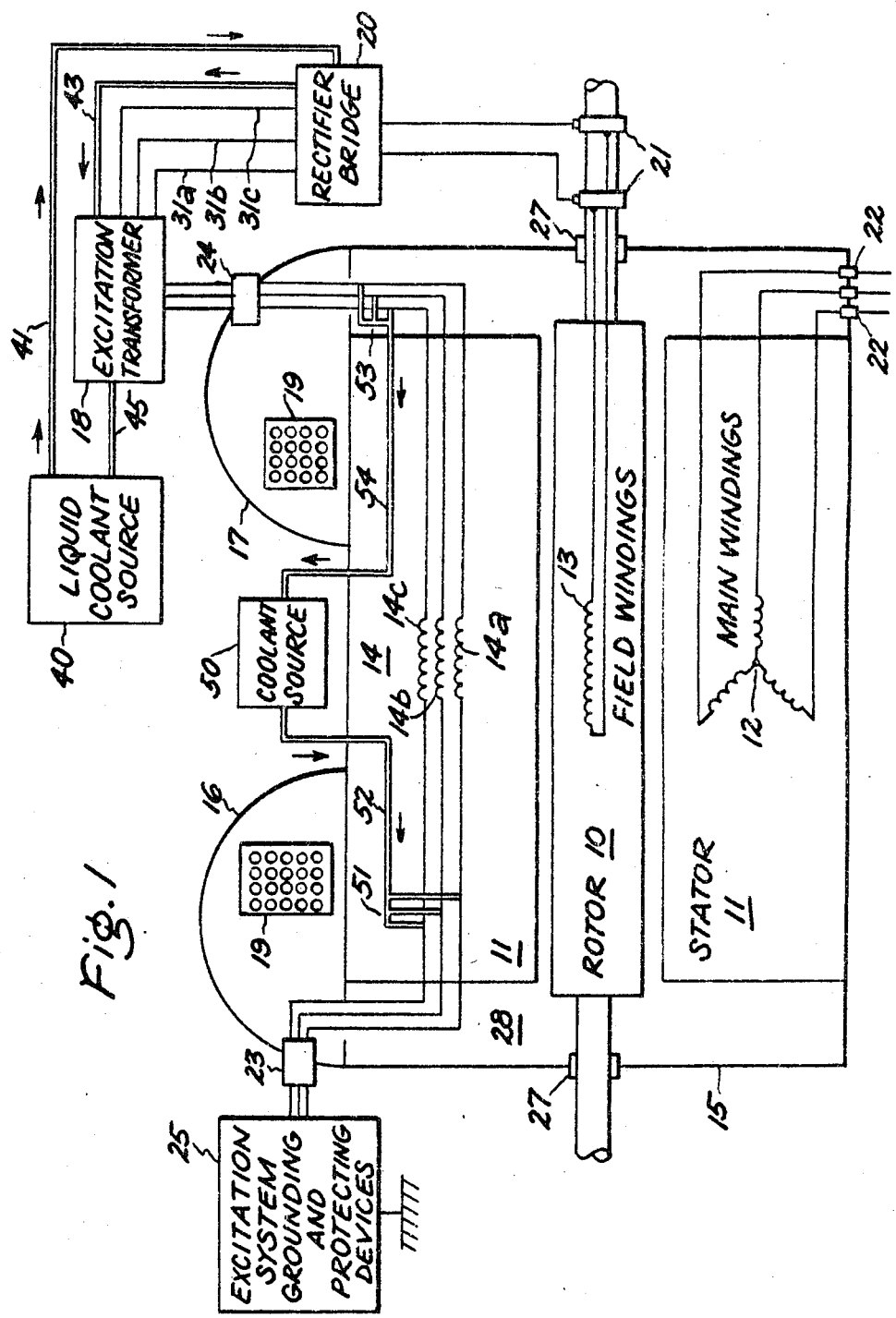
FIG. 1 is a schematic drawing, partially electrical and partially mechanical, illustrating the excitation system, including a liquid cooled excitation transformer, in accordance with the present invention.

FIG. 1 illustrates one embodiment of a typical static excitation system (described in detail in U.S. Pat. No. 4,477,767, which is incorporated herein in its entirety by reference) and associated liquid cooling, in accordance with the present invention, in combination with a large dynamoelectric machine, or generator, such as typically would be employed by an electric utility to provide electrical power. It is to be understood that the present invention is applicable to any static excitation system for a large dynamoelectric machine (such as, for example, systems described in the above-mentioned patents) which uses an excitation transformer requiring cooling other than ambient atmosphere. It is to be further understood that the present invention is generally not concerned with the details of electrical connection and/or configuration of the particular static excitation system used, except that, as previously indicated, it is desirable to situate the excitation transformer closely proximate the generator in order to minimize the length of transformer electrical primary connections to the generator and electrical secondary connections to the rectifier means.

The generator comprises an outer, pressurizable shell, or enclosure, 15 throughout which a cooling fluid 28, such as hydrogen gas, is circulated to cool the machine. Within pressurizable shell 15 there is disposed a stator 11 of conventional construction, like that disclosed in the above-mentioned U.S. Pat. No. 3,702,965. Construction of stator 11 typically comprises a large plurality of sectorally shaped metal punchings stacked so as to form a hollow cylindrical structure, the inner periphery of which possesses a plurality of longitudinal slots in which main windings 12 are disposed. It is from main windings 12 that output electrical power of the generator is provided through high voltage bushings 22. Within the hollow cylindrical portion of stator assembly 11, there is disposed a rotor 10, which is typically coupled to a steam turbine or other motive source. In order to maintain cooling fluid 28 within the generator, seals 27 are provided to cooperate with the shaft of rotor 10.

Rotor 10 comprises a large cylindrical metal forging into which longitudinal slots have been cut. Within these slots there are typically provided two or more field windings 13. It is these field windings 13 which are energized by the excitation system of the present invention. Field windings 13 produce a radially directed field of magnetic flux which cuts across main windings 12 of stator 11 during rotation of rotor 10, thereby producing the desired electrical power output which is available at bushings 22.

Because large amounts of electrical power are generated by large dynamoelectric machines, even slight inefficiencies in machine operation can be very costly and can produce large quantities of thermal energy, manifested as heat, within the machine, which heat must be removed in order to achieve long-term reliable operation demanded by intended use thereof. It is for such reasons that main windings 12 are typically cooled with a liquid coolant, such as water. This is relatively easily arranged because of the stationary nature of the main windings. However, it is also necessary to cool rotor 10. This is typically accomplished by circulating therethrough a cooling fluid 28, such as hydrogen gas, which is preferred because it is capable of absorbing and transporting relatively large amounts of thermal energy compared to other available gases, and its low density reduces windage losses in the generator. By means of rotor-mounted fans (not shown) and other conventional fluid circulating means, coolant fluid 28 is circulated past coolers 19 disposed in domes 16 and 17 which are generally situated on top of the generator. It is these coolers 19 which remove heat from cooling fluid 28 before it is cycled back to the interior of main generator housing 15 and, in particular, before it is recirculated back to the gap between rotor 10 and stator 11.

Next is considered the excitation system itself, and its relation to other components of the generator. Winding set 14 includes windings 14a, 14b and 14c. Windings 14a, 14b and 14c may comprise one or more conductive bars disposed in stator slots along with main windings 12. Windings 14a, 14b and 14c are designated potential source windings of the excitation system and are more generally referred to as "P-Bars". P-Bar windings 14 are disposed in stator slots in a manner such as that described in the above-mentioned U.S. Pat. No. 3,702,965. Typically windings 14a, 14b and 14c constitute single bars of copper located at 120° intervals about the inner circumference of generator stator 11. Preferably, one of these three P-Bars is located at the top most slot in a horizontally oriented generator stator in order to leave the bottom 120° of the stator assembly open and more amenable to insertion of the rotor forging during generator assembly. At one end, all P-Bar windings are referenced to a neutral ground so as to be arranged in an electrical Y configuration. This function is preferably performed by leading the P-Bar winding connections out from dome 16 through bushing 23 to circuit 25. Circuit 25 performs conventional fusing and circuit breaker functions for potential windings 14, both individually and collectively. At the other end of the generator, i.e. the collector end, P-Bar windings 14 are coupled directly to an excitation transformer 18 through bushing 24.

In accordance with the present invention, excitation transformer 18 is preferably disposed outside of, yet closely proximate enclosure 15 in order to minimize the length of electrical connections from bushing 24. Electrical output leads 31a, 31b and 31c, which are connected to delta-connected secondary windings 30 (FIG. 2) of excitation transformer 18, are coupled to respective inputs of rectifier bridge 20. Rectifier bridge 20 provides direct current output to fixed brushes, conventionally comprising carbon, and then to slip rings 21, which rotate with rotor 10 and are electrically coupled to field windings 13. Thus, electrical energy in alternating current form is induced in P-Bar windings 14, provided as an input to excitation transformer 18, modified therein, rectified by rectifier bridge 20 and ultimately supplied to field windings 13 in direct current form as a source for the rotating magnetic flux of rotor 10.

In addition, a coolant, like deionized water, is supplied, such as from a coolant source 50, to be in heat flow communication with at least a portion of the length of conductors forming windings 14a, 14b and 14c. Typically, the conductors constituting windings 14a, 14b and 14c comprise copper fabricated to enclose a channel through which coolant may be circulated. Coolant may be supplied from coolant source 50 via conduit means 52 to input header 51, from which it is divided and directed to flow into the conductors for each winding 14a, 14b and 14c. Coolant is removed from the conductors of windings 14a, 14b and 14c at an output header 53 and returned to coolant source 50 via conduit means 54. Coolant flow is blocked in the conductors of windings 14a, 14b and 14c, such as by disposing or fabricating a solid copper section of conductor, preferably between header 53 and bushing 24, so that coolant from the conductors of windings 14a, 14b and 14c is isolated from coolant for the conductors of the primary windings of excitation transformer 18. Coolant source 50 may also provide coolant (not shown) for cooling conductors of main windings 12 analogous to that provided for conductors of windings 14a, 14b and 14c. A liquid coolant source 40, such as a reservoir of water, and preferably deionized water, has an output thereof connected to an input of rectifier bridge 20 by conduit means 41. Liquid coolant source 40 and coolant source 50 may comprise one unit.

A coolant output of rectifier bridge 20 is shown connected to a coolant input of excitation transformer 18 by conduit means 43. A coolant output of excitation transformer 18 is connected to a coolant return input of coolant source 40 by conduit means 45, thereby completing a series liquid coolant circuit from liquid coolant source 40 through rectifier bridge 20 and excitation transformer 18. Liquid coolant returned to liquid coolant source 40 through conduit means 45 may be appropriately cooled before being recirculated to rectifier bridge 20.

Figure 2:
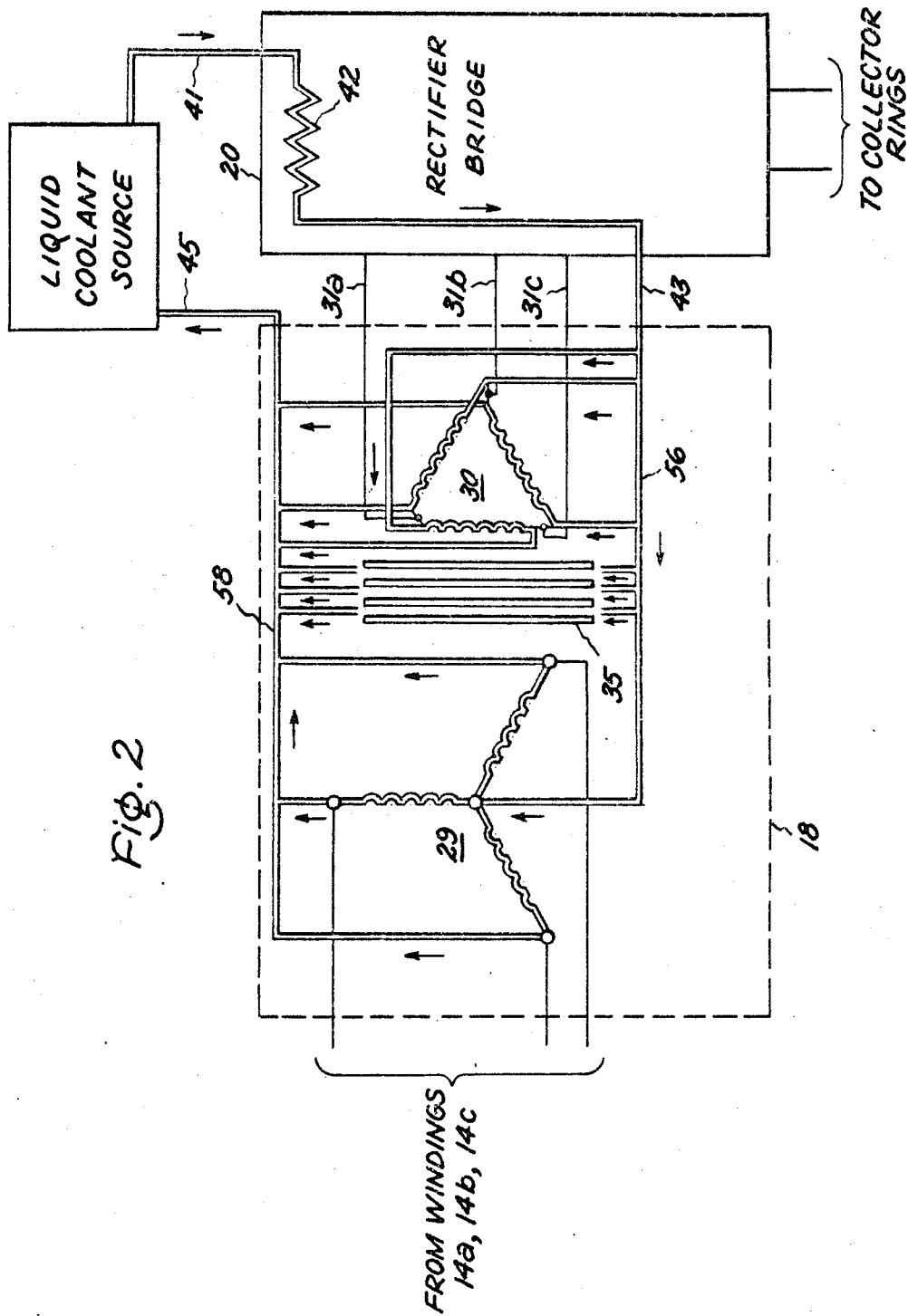
FIG. 2 is a schematic diagram particularly illustrating a cooling system for the excitation system of FIG. 1.

Referring to FIG. 2, a schematic diagram of excitation transformer 18 and associated liquid coolant source 40, in accordance with the present invention, is shown. Conduit means 41 is coupled to the coolant input of heat exchange means 42 of rectifier bridge 20 and the coolant output of heat exchange means 42 is coupled to an input header 56 of excitation transformer 18 via conduit means 43. The coolant output of an output header 58 is coupled to the coolant return input of liquid coolant source 40 through conduit means 45. Parallel cooling paths are provided between input header 56 and output header 58 for supplying coolant for cooling components of transformer 18, such as primary windings 29, secondary windings 30 and core 35. Thus, a series coolant flow path from coolant source 40 comprises conduit means 41, heat exchange means 42, conduit means 43, input header 56, output header 58 and conduit means 45. Heat exchange means comprising input header 56, output header 58 and associated parallel coolant paths of transformer 18 may be beneficially connected in series with heat exchange means 42, as shown, without appreciably sacrificing cooling efficiency, since it is anticipated that the amount of heat generated by rectifier bridge 20 that will be removed through heat exchange means 42, is relatively low. Alternatively, heat exchange means 42 and input header 56 may be appropriately independently connected to liquid coolant source 40.

Liquid coolant is directed from input header 56 to output header 58 through parallel coolant flow paths of hollow conductors forming primary and secondary windings 29 and 30, respectively, and through flow passages in core 35, so that liquid coolant is in heat flow communication with primary and secondary windings 29 and 30, respectively, and core 35. Since rectifier bridge 20 is generally situated closely proximate pressurizable shell 15 (FIG. 1) of the generator, excitation transformer 18 may likewise be situated closely proximate, yet external to, pressurizable shell 15 (FIG. 1) of the generator in order to take advantage of liquid coolant which is available from coolant source 40 when coolant flow is configured in accordance with the present invention. Although coolant flow through excitation transformer 18 is shown to be serially connected with heat exchange means 42, it is possible that excitation transformer 18 may be supplied directly from liquid coolant source 40, such as by connecting header 56 to a second output of liquid coolant source 40, or to a flow dividing means disposed in conduit means 41, and by providing a coolant return path from the output of header 58 to a second coolant return input of liquid coolant source 40, or to a flow combining means disposed in conduit means 45. However, since the amount of heat required to be absorbed by and carried away by coolant flowing through heat exchange means 42 is anticipated to be relatively small, series coolant flow through heat exchange means 42 and excitation transformer 18 as shown in FIG. 2 would not impair operation of excitation transformer 18.

Referring to FIG. 3, a schematic diagram illustrating another embodiment of a cooling system for the excitation system of FIG. 1 is shown. Electrical output leads 31a, 31b and 31c of excitation transformer 18 are hollow, so that liquid coolant can flow therethrough. The coolant output of heat exchange means 42 is connected to output lead 31c of excitation transformer 18, thereby eliminating need for conduit 43. Output lead 31c is fluidically coupled to input header 60, which supplies liquid coolant to core 35, primary windings 29 and secondary windings 30 of excitation transformer 18. Coolant outputs from windings 29 and 30 and core 35 are coupled to output header 65 which is connected to return conduit 45 through leads 31a and 31b. In this configuration, the internal passage of output lead 31c may be larger than either of the internal passages of output leads 31a and 31b. Alternatively, two output leads, say 31b and 31c may be used to supply coolant to excitation transformer 18 from heat exchange means 42, and one output lead, say 31a, may be used to provide a portion of the coolant flow path from excitation transformer 18 to liquid coolant source 40.

Use of liquid coolant to cool components of the excitation system in accordance with the present invention permits use of a smaller transformer 18 over those previously employed and/or permits the rating of a transformer 18 having the same size, or outline dimensions, as those previously employed with a gaseous coolant, to be increased, thereby increasing the power supplied to field windings 13 (FIG. 1) and ultimately increasing the potential maximum power output of the generator. The size of transformer 18 may be further reduced and/or its rating increased, when a liquid coolant is employed in accordance with the present invention, by beneficially employing space within transformer 18 which was previously required for gaseous cooling ducts that directed and maintained gaseous coolant in contact with the core.

Thus has been illustrated and described a static excitation system for a large dynamoelectric machine wherein coolant flow within components of the excitation system is isolated from the coolant system of the machine. Also shown and described is a static excitation system wherein liquid coolant, such as from an existing source of de-ionized water, is used to cool the core and windings of a transformer of the excitation system, thereby permitting use of a smaller excitation transformer than those transformers previously used and/or increasing the output rating of an excitation transformer having the same outline dimensions as previously used excitation transformers, while allowing the transformer to be disposed outside and closely proximate the dynamoelectric machine, and eliminating undesirable features of a pressure vessel enclosure that are required when using a gas cooled transformer.

While only certain preferred features of the invention have been shown by way of illustration, many modifications and changes will occur to those skilled in the art. It is to be understood that the appended claims are intended to cover all such modifications and changes as fall within the true spirit and scope of the invention.

What is claimed is:

1. A static excitation system for a dynamoelectric machine, the machine having a rotatable field winding for producing a rotating magnetic field, a stator core with a multiphase set of main armature windings disposed in slots in the stator core and first cooling means for providing a first coolant for cooling at least the set of main armature windings, the excitation system comprising:

a multiphase excitation transformer having a core and a set of respective primary windings respectively coupled to predetermined respective main armature windings of the set of main armature windings and a set of secondary windings, the secondary windings respectively corresponding to and in electromagnetic flux flow communication with the windings of the set of primary windings;

rectifier means electrically coupled to the set of secondary windings for supplying electrical energy to the field winding for producing the magnetic field;

wherein said excitation transformer includes first heat exchange means in heat flow communication with the primary and secondary windings and with the core of the excitation transformer, said first heat exchange means operationally including a liquid coolant for cooling the core of the transformer; and, wherein the rectifier means includes second heat exchange means for cooling the rectifier means, the second heat exchange means coupled in series liquid coolant flow communication with the first heat exchange means.

2. The static excitation system as in claim 1, wherein the liquid coolant is isolated from the first coolant.

3. The static excitation system as in claim 1, wherein the liquid coolant includes a portion of the first coolant.

4. The static excitation system as in claim 1, wherein the liquid coolant includes de-ionized water.

5. The static excitation system as in claim 1, wherein the field winding and stator core are disposed within a housing and the excitation transformer is disposed outside and closely proximate the housing.

6. The static excitation system as in claim 1, further including coolant source means for supplying the liquid coolant, the first and second heat exchange means coupled to the coolant source means such that liquid coolant flows from said coolant source means to said second heat exchange means and then to said first heat exchange means.

7. The static excitation system as in claim 1, wherein the rectifier means is electrically coupled at least in part to the set of secondary windings by at least one hollow electrical conductor so that liquid coolant flows through said at least one hollow electrical conductor to said first heat exchange means.

8. The static excitation system as in claim 6, wherein the rectifier means is electrically coupled at least in part to the set of secondary windings by at least one hollow electrical conductor so that liquid coolant flows from said second heat exchange means to said first heat exchange means through said at least one hollow electrical conductor.

9. The static excitation system as in claim 7, wherein the rectifier means is further electrically coupled at least in part to the set of secondary windings by at least another hollow electrical conductor so that liquid coolant from said first heat exchange means can flow to a liquid coolant source means at least in part through the at least another hollow electrical conductor.

10. The static excitation system as in claim 8, wherein the rectifier means is further electrically coupled at least in part to the set of secondary windings by at least another hollow electrical conductor so that liquid coolant flow from said first heat exchange means can flow to a liquid coolant source means at least in part through the at least another hollow electrical conductor.

11. A static excitation system for a dynamoelectric machine, the machine including a housing, a rotatable field winding for producing a rotating magnetic field, a stator core with a multiphase set of main armature windings disposed in slots in the stator core, and cooling means disposed in heat flow communication with the field winding and stator core for cooling the field winding and stator core, wherein the field winding, stator core and cooling means are disposed within the housing, the excitation system comprising:

a multiphase transformer, disposed outside of, yet closely proximate the housing, having a core, a set of primary windings respectively electromagnetically coupled to respective main armature windings of the set of main armature windings and a set of secondary windings, the secondary windings respectively corresponding to and in electromagnetic flux flow communication with respective windings of the set of primary windings, the transformer including first heat exchange means in heat flow communication with the primary and secondary windings and with the core and coupled in liquid coolant flow communication with liquid coolant source means for receiving a first liquid coolant; and rectifier means electrically coupled to the set of secondary windings for supplying electrical energy to the field windings for producing the magnetic field.

12. The static excitation system as in claim 11, wherein the rectifier means includes second heat exchange means for cooling the rectifier means and further wherein the first and second heat exchange means are coupled in series liquid coolant flow communication such that liquid coolant from the liquid coolant source means flows to said second heat exchange means and then to said first heat exchange means.

13. The static excitation system as in claim 11, wherein the rectifier means is electrically coupled at least in part to the set of secondary windings by at least one hollow electrical conductor so that liquid coolant flows from said second heat exchange means to said first heat exchange means through said at least one hollow electrical conductor.

14. The static excitation system as in claim 13, wherein the rectifier means is further electrically coupled at least in part to the set of secondary windings by at least another hollow electrical conductor so that liquid coolant from said first heat exchange means flows to the liquid coolant source means at least in part through the at least another hollow electrical conductor.

15. The static excitation system as in claim 11, wherein the cooling means supplies a second liquid coolant for cooling at least the stator core and further wherein the liquid coolant source means constitutes a part of the cooling means and still further wherein the first liquid coolant and the second liquid coolant are isolated from each other.

16. The static excitation system as in claim 12, wherein the rectifier means is electrically coupled at least in part to the set of secondary windings by at least one hollow electrical conductor so that liquid coolant flows from said second heat exchange means to said first heat exchange means through said at least one hollow electrical conductor.

17. The static excitation system as in claim 16, wherein the rectifier means is further electrically coupled at least in part to the set of secondary windings by at least another hollow electrical conductor so that liquid coolant from said first heat exchange means flows to the liquid coolant source means at least in part through the at least another hollow electrical conductor.

* * * * *